(12) United States Patent
Sugimoto

(10) Patent No.: US 9,719,538 B2
(45) Date of Patent: Aug. 1, 2017

(54) FASTENING STRUCTURE FOR RESIN-FOAM CORE COMPOSITE PLATE

(71) Applicant: Kobe Steel, Ltd., Hyogo (JP)

(72) Inventor: Akio Sugimoto, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 462 days.

(21) Appl. No.: 14/375,923

(22) PCT Filed: Feb. 22, 2013

(86) PCT No.: PCT/JP2013/054597
§ 371 (c)(1),
(2) Date: Jul. 31, 2014

(87) PCT Pub. No.: WO2013/129262
PCT Pub. Date: Sep. 6, 2013

(65) Prior Publication Data
US 2015/0016871 A1 Jan. 15, 2015

(30) Foreign Application Priority Data

Feb. 27, 2012 (JP) .................................. 2012-040183

(51) Int. Cl.
*F16B 5/04* (2006.01)
*F16B 5/00* (2006.01)
(Continued)

(52) U.S. Cl.
CPC .......... *F16B 5/0096* (2013.01); *B21D 39/032* (2013.01); *B21J 15/04* (2013.01);
(Continued)

(58) Field of Classification Search
CPC ...... B60R 13/0206; F16B 13/00; F16B 13/08; F16B 5/04; F16B 5/08
See application file for complete search history.

(56) References Cited

U.S. PATENT DOCUMENTS 3,434,262 A * 3/1969 Lawrence .................. F16B 5/01
244/132
3,512,328 A * 5/1970 Eriksson .................... F16B 5/01
411/118
(Continued)

FOREIGN PATENT DOCUMENTS

CN 1955497 A 5/2007
JP S60-023338 U 2/1985
(Continued)

OTHER PUBLICATIONS

International Search Report; PCT/JP2013/054597; May 14, 2013.
Written Opinion of the International Searching Authority; PCT/JP2013/054597; May 14, 2013.

*Primary Examiner* — Daniel Wiley
(74) *Attorney, Agent, or Firm* — Studebaker & Brackett PC

(57) ABSTRACT

In the present invention, a through-hole (2) and a compression periphery part (3a) at which the core of the resin foam (1c) is compressed are provided in a fastening part of a resin-foam core composite plate (1). A cylindrical part (11a) of a metallic fastening member (11) is inserted into the through-hole (2) from the proximal end side of a wall part (4). The fastening member (11) is crimped to the distal end of the wall part (4) via an eyelet member (12) placed on the outside of the wall part (4) so as to forcibly spread the cylindrical part (11a). The fastening member (11) and a counterpart member (A) are fastened together by tightening a nut (14) onto a bolt (13) inserted into the cylindrical part (11a).

10 Claims, 7 Drawing Sheets

(51) Int. Cl.

| | |
|---|---|
| *F16B 5/08* | (2006.01) |
| *F16B 19/08* | (2006.01) |
| *B21D 39/03* | (2006.01) |
| *B60R 13/02* | (2006.01) |
| *B23K 11/00* | (2006.01) |
| *B21J 15/04* | (2006.01) |
| *F16B 13/00* | (2006.01) |
| *F16B 19/02* | (2006.01) |
| *B29L 31/00* | (2006.01) |
| *B29C 65/56* | (2006.01) |
| *B29C 65/64* | (2006.01) |
| *B29C 65/00* | (2006.01) |
| *F16B 5/01* | (2006.01) |

(52) U.S. Cl.
CPC ........ *B23K 11/002* (2013.01); *B60R 13/0206* (2013.01); *F16B 5/04* (2013.01); *F16B 5/08* (2013.01); *F16B 13/00* (2013.01); *F16B 19/02* (2013.01); *F16B 19/08* (2013.01); *B29C 65/562* (2013.01); *B29C 65/64* (2013.01); *B29C 66/21* (2013.01); *B29C 66/71* (2013.01); *B29C 66/727* (2013.01); *B29C 66/72321* (2013.01); *B29C 66/742* (2013.01); *B29C 66/81427* (2013.01); *B29C 66/81431* (2013.01); *B29C 66/8322* (2013.01); *B29L 2031/737* (2013.01); *F16B 5/01* (2013.01); *Y10T 403/478* (2015.01); *Y10T 403/4949* (2015.01)

(56) References Cited

U.S. PATENT DOCUMENTS

| | | | | |
|---|---|---|---|---|
| 4,010,519 | A * | 3/1977 | Worthing | F16B 19/10 24/67 CF |
| 4,557,100 | A * | 12/1985 | Gorges | B21K 21/00 411/501 |
| 4,647,264 | A * | 3/1987 | Pamer | F16B 19/1027 24/94 |
| 4,792,475 | A * | 12/1988 | Bien | B62D 29/048 403/408.1 |
| 4,817,264 | A * | 4/1989 | Worthing | B29C 66/7392 29/512 |
| 4,878,795 | A | 11/1989 | Woodrow et al. | |
| 4,973,102 | A * | 11/1990 | Bien | B62D 29/048 296/187.01 |
| 5,542,777 | A * | 8/1996 | Johnson | B61D 17/043 403/384 |
| 8,684,436 | B2 * | 4/2014 | Keller | B60R 13/0206 296/1.08 |
| 8,747,015 | B1 * | 6/2014 | Polewarczyk | F16B 33/002 403/384 |
| 8,793,860 | B2 * | 8/2014 | Kashimura | F16B 5/01 29/512 |
| 8,808,830 | B2 * | 8/2014 | Preisler | B60R 13/011 296/39.1 |
| 8,859,074 | B2 * | 10/2014 | Preisler | B62D 25/20 296/39.1 |
| 2005/0155305 | A1* | 7/2005 | Cosenza | F16B 5/01 52/317 |
| 2007/0068116 | A1 | 3/2007 | Droulez et al. | |
| 2014/0341643 | A1* | 11/2014 | Okamoto | F16B 5/04 403/278 |
| 2015/0137560 | A1* | 5/2015 | Preisler | B32B 7/12 296/193.07 |
| 2015/0145276 | A1* | 5/2015 | Preisler | B60R 13/011 296/97.23 |

FOREIGN PATENT DOCUMENTS

| | | |
|---|---|---|
| JP | H01-153807 A | 6/1989 |
| JP | 2000-291711 A | 10/2000 |
| JP | 2009-090522 A | 4/2009 |
| JP | 2011-133088 A | 7/2011 |
| JP | 2012-037051 A | 2/2012 |

* cited by examiner

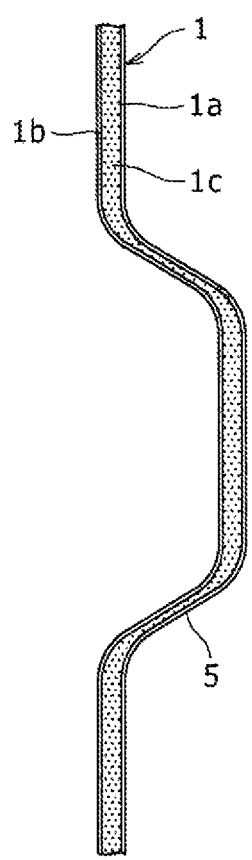 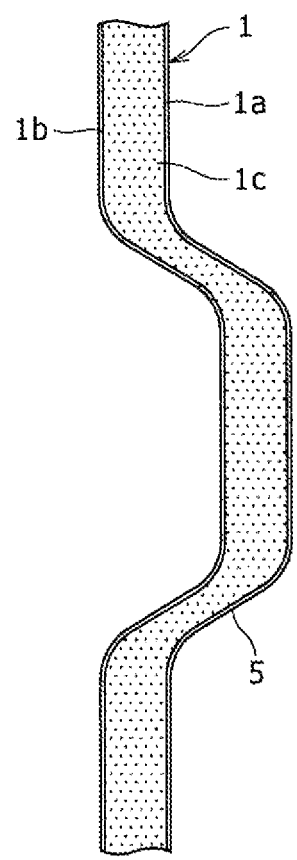

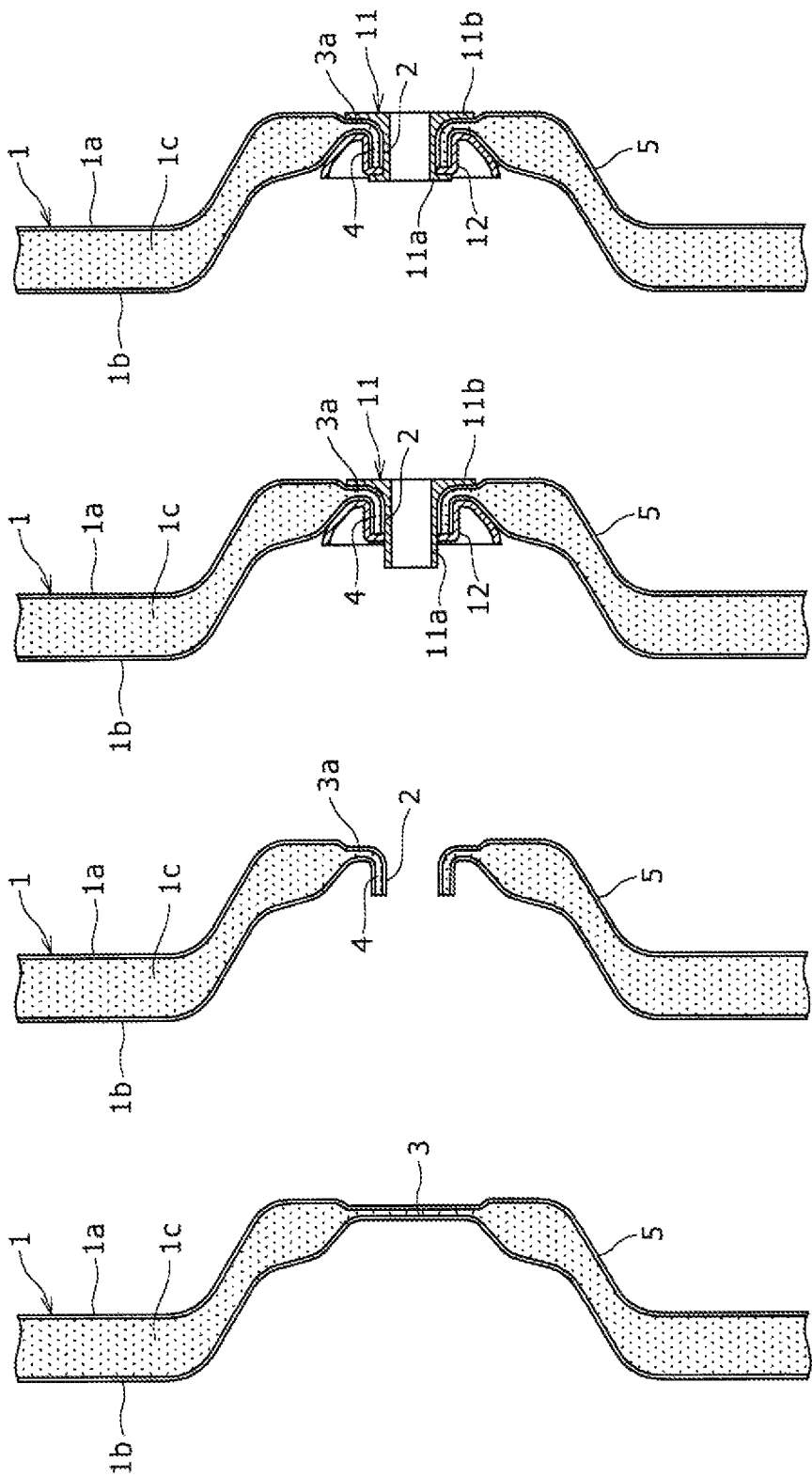

FASTENING STRUCTURE FOR RESIN-FOAM CORE COMPOSITE PLATE

TECHNICAL FIELD

The present invention relates to a fastening structure for a resin-foam core composite plate which fastens a resin-foam core composite plate to a counterpart member.

BACKGROUND ART

For a variety of panel members, such as outer panels and inner panels, and cover members, such as heat insulators and floor undercovers, of a vehicle, a resin-foam core composite plate formed by sandwiching a core of a resin foam between metal plates such as steel plates or aluminum plates is used (for example, see Patent Document 1). This is aimed at giving weight reduction, damping performance, and sound insulating performance of the vehicle.

The panel members and the cover members of the vehicle are frequently fastened to other members of the same part or a counterpart member such as a frame member by resistance welding or bolt fastening. However, since the soft resin foam that does not conduct electricity is interposed as the core, these members formed of the resin-foam core composite plate cannot be fastened by the resistance welding. Further, there is a drawback in that these members cannot be robustly fastened to the counterpart member even by the bolt fastening.

As a means for robustly fastening the resin-foam core composite plate to the counterpart member by the bolt fastening, a fastening structure configured to insert bolts into bolt holes formed in the composite plate and to interpose a cylindrical member, which is made up of a body part longer than a thickness of the composite plate and flange parts, between the bolt and the bolt hole is proposed. In this structure, by tightening the body part of the cylindrical member using the bolt, front and rear metal plates are sandwiched between the body part, which is deformed to protrude toward a core layer side, and the flange part or the counterpart member. Further, similarly, there is a proposal for a fastening structure configured to interpose a plurality of disc springs having a conical surface between a bolt hole and a bolt inserted into the bolt hole (for example, see Patent Document 2). In this structure, by tightening the disc springs using the bolt, front and rear metal plates are sandwiched between the disc springs, which are flatly deformed to protrude toward a core layer side, and a washer or the counterpart member.

CITATION LIST

Patent Document

Patent Document 1: JP 2009-90522 A
Patent Document 2: JP 2011-133088 A

SUMMARY OF THE INVENTION

According to the fastening structure for the resin-foam core composite plate described in Patent Document 2, robust fastening is possible at the inception of the fastening. However, in such a structure, the resin foam of the core enters between the body part of the cylindrical member or the disc springs, either of which protrudes toward the core layer side due to the fastening of the bolt, and the metal plates of front and rear surfaces, or between layers of the plurality of disc springs on a region on which a fastening force of the bolt acts. The entered resin foam having a great thermal expansion coefficient escapes gradually due to a temperature difference, repetition of expansion and contraction caused by a heating/cooling cycle generated by heat from an engine, or vibrations of a vehicle. As such, there is a problem that the fastening force of the bolt is reduced over time. Further, there is also a problem that this fastening structure cannot be applied to the fastening based on the easy resistance welding.

Accordingly, an object of the present invention is to provide a fastening structure for a resin-foam core composite plate, which is applicable to any one of bolt fastening and resistance welding and is capable of maintaining robust fastening to a counterpart member for a long period of time.

To accomplish the object, the present invention provides a fastening structure for a resin-foam core composite plate, in which the resin-foam core composite plate is stacked by sandwiching a core of a resin foam between metal plates and is fastened to a counterpart member, wherein: a fastening part of the resin-foam core composite plate includes a through-hole and a compression periphery part at which the core of the resin foam is compressed around the through-hole; and a metallic fastening member inserted into the through-hole is coupled to the compression periphery part by crimping or welding, so that the fastening, member is fastened to the counterpart member.

In other words, the metallic fastening member inserted into the through-hole is coupled to the compression periphery part by crimping or welding, and the fastening member is fastened to the counterpart member, so that the metallic fastening member is robustly coupled to the fastening part of the resin-foam core composite plate by crimping or welding. Thereby, any one of bolt fastening and resistance welding can be applied, and robust fastening to the counterpart member can be maintained for a long period of time.

In the above-mentioned fastening structure for the resin-foam core composite plate, the fastening member may have a pedestal-attached cylindrical shape in which a pedestal part thereof is provided at one end side of a cylindrical part thereof, and the compression periphery part may include a tubular wall part standing from a periphery of the through-hole. The cylindrical part of the fastening member may be inserted into the through-hole from a proximal end side of the wall part, pressing the pedestal part against the compression periphery part, and the fastening member may be crimped to a distal end side of the wall part so as to forcibly spread a distal end side of the cylindrical part protruding from the distal end side of the wall part.

An eyelet member may be placed outside the wall part so as to fit an eyelet of the eyelet member to the through-hole, and the distal end side of the cylindrical part may be crimped to the distal end side of the wall part via the eyelet member. Thereby, the wall part is sandwiched by the cylindrical part and the eyelet member, so that it is possible to more robustly couple the fastening member.

In the above-mentioned fastening structure for the resin-foam core composite plate, the fastening member may have a hat shape in which a flange part thereof is provided for a lower end of a hat part thereof. The flange part may be pressed against an outer surface side of one of the metal plates at a periphery part of the through-hole, and the hat part may be compressed together with the core of the resin foam at the periphery part of the through-hole so as to forcibly spread the hat part inserted into the through-hole toward an outer surface side of the other of the metal plates in a flat shape. Thereby, the front and rear metal plates of the compression periphery part may be sandwiched by the hat part forcibly spread in the flat shape and the flange part, and the sandwiching hat and flange parts may be welded to the front and rear metal plates of the compression periphery part.

In the above-mentioned fastening structure for the resin-foam core composite plate, the fastening member may have a bowl shape in which a slant wall part thereof spreads to an outer circumferential side thereof around a bottom thereof. The bowl-shaped fastening member may be inserted into the through-hole, and the bowl-shaped fastening member may be compressed together with the core of the resin foam at the periphery part of the through-hole so as to forcibly spread the slant wall part toward a side of the resin foam between the metal plates in a flat shape. Thereby, the slant wall part forcibly spread in the flat shape may be sandwiched by the front and rear metal plates of the compression periphery part, and the sandwiched slant wall part may be welded to the front and rear metal plates of the compression periphery part.

A step part is formed at an outer circumferential side of the fastening part of the resin-foam core composite plate, so that it is possible to increase rigidity in the vicinity of the fastening part.

The step part is formed in a state in which the resin foam is not foamed, and then the resin foam is foamed. Thereby, the step part can be easily formed by press molding, and the resin foam of the step part is not compressed during the molding.

In the fastening structure for the resin-foam core composite plate according to the present invention, a fastening part of the resin-foam core composite plate is provided with a through-hole and a compression periphery part at which a core of a resin foam is compressed around the through-hole. A metallic fastening member inserted into the through-hole is coupled to the compression periphery part by crimping or welding so that the fastening member is fastened to a counterpart member. As such, any one of bolt fastening and resistance welding can be applied, and robust fastening to the counterpart member can be maintained.

BRIEF DESCRIPTION OF DRAWINGS

FIGS. 2(a) and 2(b) are cross-sectional views illustrating a process of forming a step part on the resin-foam core composite plate of FIG. 1.

FIGS. 3(a) to 3(d) are cross-sectional views illustrating a process of forming the fastening structure of FIG. 1.

DESCRIPTION OF EMBODIMENTS

Figure 1:
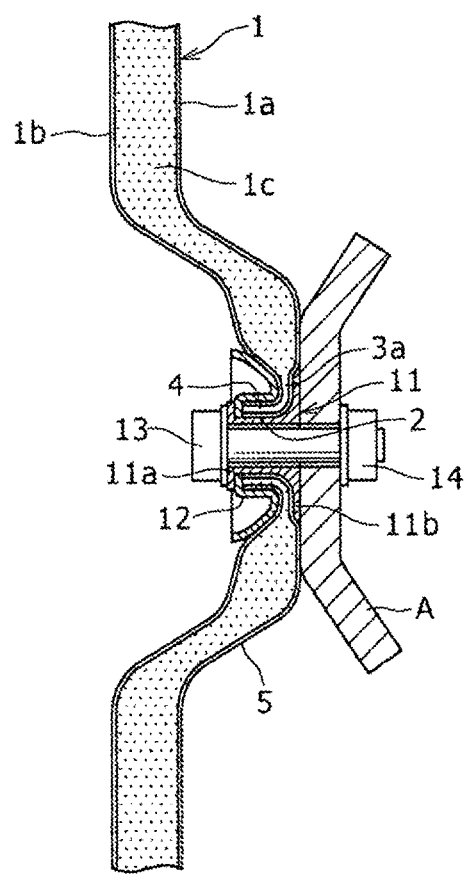
FIG. 1 is a longitudinal sectional view illustrating a fastening structure for a resin-foam core composite plate according to a first embodiment.

Hereinafter, embodiments of the present invention will be described based on the drawings. FIGS. 1, 2(a), 2(b), 3(a), 3(b), 3(c), and 3(d) illustrate a first embodiment. As illustrated in FIG. 1, a resin-foam core composite plate 1 is formed by sandwiching a core of a resin foam 1c formed of a polyolefin resin between front and rear metal plates 1a and 1b that are steel or aluminum plates and stacking the resultant. A fastening part of the resin-foam core composite plate 1 is provided with a through-hole 2 and a compression periphery part 3a formed by compressing the resin foam 1c around the through-hole 2. The compression periphery part 3a is provided with a tubular wall part 4 standing from a periphery of the through-hole 2. A metallic fastening member 11 provided with a pedestal part 11b at one end side of a cylindrical part 11a is inserted into the through-hole 2 from a proximal end side of the wall part 4 so as to press the pedestal part 11b against the compression periphery part 3a. An eyelet member 12 is placed outside the wall part 4, and an eyelet of the eyelet member 12 is fitted to the through-hole 2. The fastening member 11 is crimped to a distal end side of the wall part 4 via the eyelet member 12 so as to forcibly spread a distal end side of the cylindrical part 11a protruding from the distal end side of the wall part 4, and is robustly coupled to the fastening part of the resin-foam core composite plate 1. A bolt 13 is inserted into the penetrated cylindrical part 11a, and tightens the fastening member 11 and the counterpart member A with a nut 14. Thereby, the fastening member 11 and the counterpart member A are bolt-fastened. A step part 5 for increasing rigidity in the vicinity of the fastening part of the resin-foam core composite plate 1 is formed at an outer circumferential side of the fastening part of the resin-foam core composite plate 1.

FIG. 2 illustrates a process of forming the step part 5 of the resin-foam core composite plate 1. First, as illustrated in FIG. 2(a), in a state in which the resin foam 1c is not foamed, the step part 5 is formed. Thereafter, as illustrated in FIG. 2(b), by heating the resin-foam core composite plate 1 within which the step part 5 is formed, the resin foam 1c is foamed. Thus, the step part 5 can be easily molded by press molding, and the resin foam is of the step part 5 is not compressed during the molding.

FIGS. 3(a) to 3(d) illustrate a process of forming the fastening structure of the first embodiment. First, as illustrated in FIG. 3(a), the compression part 3 at which the resin foam 1c is compressed is formed around the fastening part of the resin-foam core composite plate 1 by press working. Then, as illustrated in FIG. 3(b), the through-hole 2 is punched in a central fastening part of the compression part 3. Thereby, the tubular wall part 4 standing from a periphery of the through-hole 2 is formed at the compression periphery part 3a in which the through-hole 2 is punched.

Thereafter, as illustrated in FIG. 3(c), the cylindrical part 11a of the fastening member 11 is inserted from a proximal end side of the wall part 4, and the pedestal part 11b is pressed against the compression periphery part 3a. Furthermore, the eyelet member 12 is placed outside a distal end face and an outer circumferential surface of the wall part 4. Then, as illustrated in FIG. 3(d), the fastening member 11 is crimped to a distal end side of the wall part 4 via the eyelet member 12 so as to forcibly spread a distal end side of the cylindrical part 11a protruding from the distal end side of the wall part 4. Finally, as illustrated in FIG. 1, the fastening member 11 and a counterpart member A are tightened by a bolt 13 inserted into the cylindrical part 11a and a nut 14, and thereby the counterpart member A is bolt-fastened to the fastening member 11.

In the first embodiment described above, the fastening member 11 and the counterpart member A are fastened by the bolt fastening. However, the pedestal part 11b of the fastening member 11 is configured to block one end side of the cylindrical part 11a, and thereby the pedestal part 11b and the counterpart member A may be fastened by resistance welding.

Figure 4:
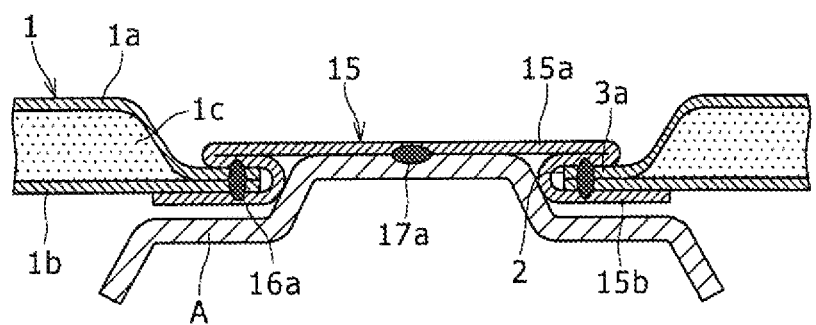
FIG. 4 is a longitudinal sectional view illustrating a fastening structure for a resin-foam core composite plate according to a second embodiment.
Figure 5A:
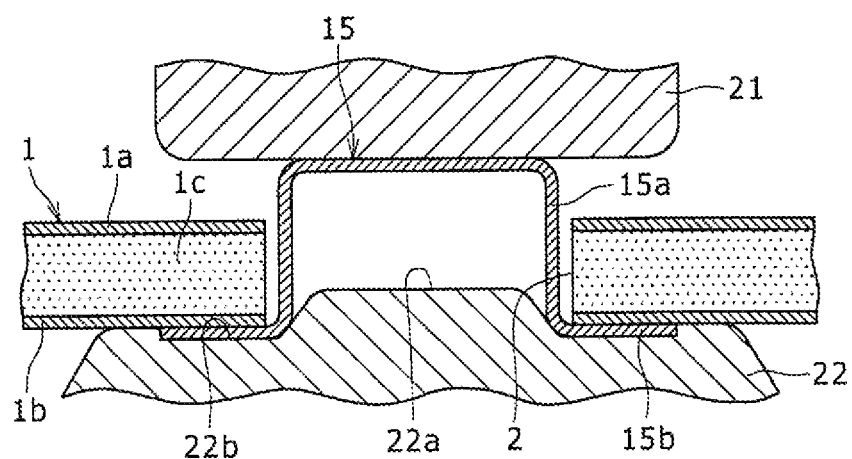
FIGS. 5(a) and 5(b) are cross-sectional views illustrating a process of forming the fastening structure of FIG. 4.
Figure 5B:
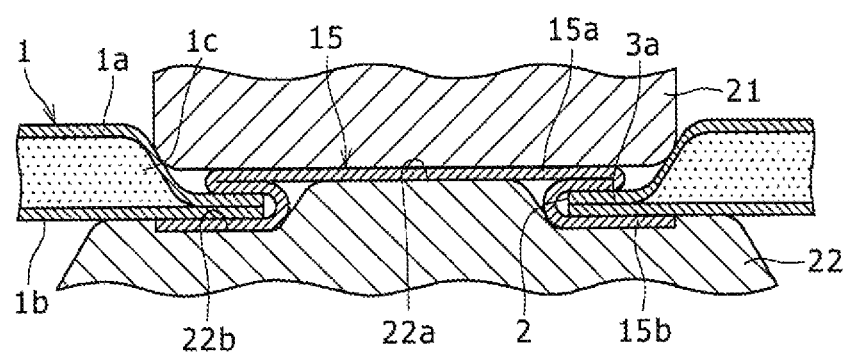

FIGS. 4, 5(a), and 5(b) illustrate a second embodiment. In this fastening structure for the resin foam core composite plate, as illustrated in FIG. 4, use is made of a metallic fastening member 15 that has a flange part 15b at a lower end of a hat part 15a and takes a hat shape. A fastening part of a resin-foam core composite plate 1 similar to that of the first embodiment is provided with a through-hole 2. The hat part 15a of the fastening member 15 is inserted into the through-hole 2, and the flange part 15b is pressed against a lower surface side of a rear-side metal plate 1b around the through-hole 2. The fastening member 15 compresses the inserted hat part 15a together with a core of a resin foam 1c around the through-hole 2 so as to forcibly spread the inserted hat part 15a toward a upper surface side of a front-side metal plate 1a in a flat shape. Thereby, the hat part 15a forcibly spread in the flat shape and the flange part 15b sandwich the front and rear metal plates 1a and 1b of a compression periphery part 3a, at which the resin foam 1c is compressed, around the through-hole 2, and are robustly coupled to the metal plates 1a and 1b by a resistance weld 17a. A counterpart member A is fastened to a ceiling part of the hat part 15a blocking the through-hole 2 by a resistance weld 17a. Although not illustrated, a step part for increasing rigidity is formed at an outer circumferential side of the fastening part of the resin-foam core composite plate 1, as in the first embodiment.

FIGS. 5(a) and 5(b) illustrate a process of forming the fastening structure of the second embodiment. First, as illustrated in FIG. 5(a), the hat part 15a of the fastening member 15 is inserted from below into the through-hole 2 formed in the fastening part of the resin-foam core composite plate 1. The flange part 15b is pressed against the lower surface side of the rear-side metal plate 1b at a periphery part of the through-hole 2, and the fastening member 15 is set between a punch 21 and a die 22. The punch 21 is a flat-head punch. A die face of the die 22 with which the metal plate 1b comes into contact is provided with a circular convex part 22a put into the hat part 15a and an annular concave part 22b into which the flange part 15b is put.

Thereafter, as illustrated in FIG. 5(b), the punch 21 moves down to a position at which the ceiling part of the hat part 15a collides with the convex part 22a of the die 22. The punch 21 compresses the hat part 15a together with the resin foam 1c around the through-hole 2 so as to forcibly spread the hat part 15a toward the upper surface side of the front-side metal plate 1a in a flat shape. The front and rear metal plates 1a and 1b of the compression periphery part 3a at which the resin foam 1c is compressed are sandwiched by the hat part 15a and the flange part 15b forcibly spread in a flat shape. Finally, as illustrated in FIG. 4, the forcibly spread hat part 15a and the flange part 15b are coupled to the front and rear metal plates 1a and 1b by the resistance weld 16a, and the counterpart member A is fastened to the ceiling part of the hat part 15a by the resistance weld 17a. Further, when the front and rear metal plates 1a and 1b of the resin-foam core composite plate 1 are aluminum alloy plates, the metallic fastening member 15 is formed of an aluminized steel plate, so that weld strength between the metal plates 1a and 1b and the aluminum alloy plates can be increased. Further, since the plated surface layer of the fastening member 15 is of aluminum having high heat-ray reflectance, the fastening member 15 absorbs heat rays, and thereby an effect of preventing heat from being conducted to the resin foam 1c can also be expected.

Figure 6:
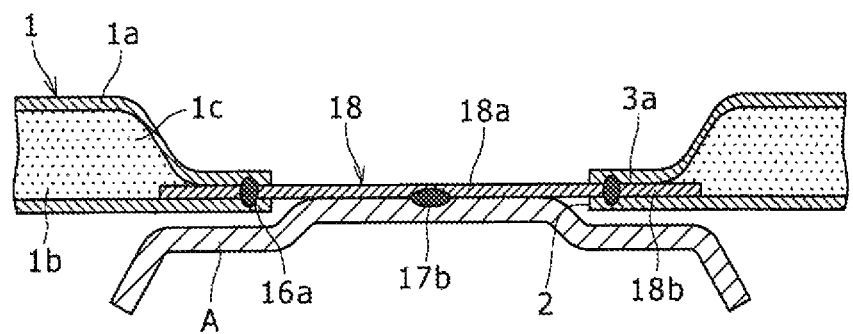
FIG. 6 is a longitudinal sectional view illustrating a fastening structure for a resin-foam core composite plate according to a third embodiment.

FIGS. 6, 7, 8(a), and 8(b) illustrate a third embodiment. In this fastening structure for the resin-foam core composite plate, as illustrated in FIG. 6, use is made of a metallic fastening member 18 that has a slant wall part 18b spreading around a bottom 18a toward an outer circumferential side and takes a bowl shape. A fastening part of a resin-foam core composite plate 1 similar to that of the first embodiment is provided with a through-hole 2, and the fastening member 18 is inserted into the through-hole 2. The slant wall part 18b is compressed together with a resin foam is around the through-hole 2 so as to be forcibly spread toward the side of the resin foam 1c between front and rear metal plates 1a and 1b in a flat shape. The slant wall part 18b, which is forcibly spread so as to be sandwiched between the metal plates 1a and 1b of a compression periphery part 3a, at which the resin foam 1c is compressed, around the through-hole 2, is robustly coupled to the front and rear metal plates 1a and 1b by a resistance weld 16b. A counterpart member A is fastened to the bottom 18a of the fastening member 18 by a resistance weld 17b. Although not illustrated, a step part for increasing rigidity is formed at an outer circumferential side of the fastening part of the resin-foam core composite plate 1, as in the first embodiment.

Figure 7:
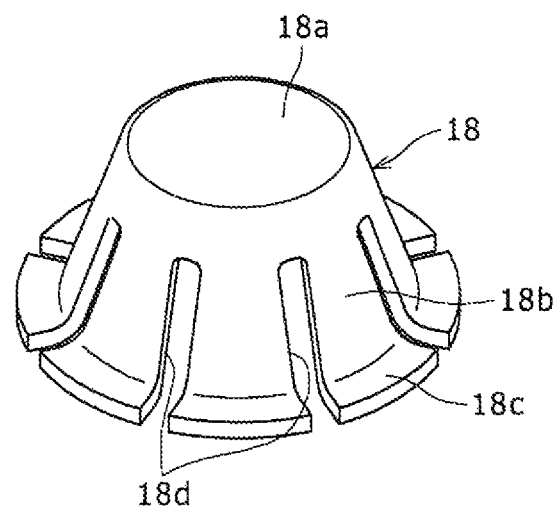
FIG. 7 is an outline perspective view illustrating a fastening member of FIG. 6.

FIG. 7 illustrates the bowl-shaped fastening member 18. The slant wall part 18b is provided with a flat part 18c having no inclination at an outer circumferential side thereof so as to facilitate forcibly spread deformation of the compression periphery part 3a between the metal plates 1a and 1b, and a plurality of cutouts 18d are formed from the outer circumferential side thereof. Alternatively, the fastening member 18 may be used in such a way that a plurality of sheets are stacked.

Figure 8A:
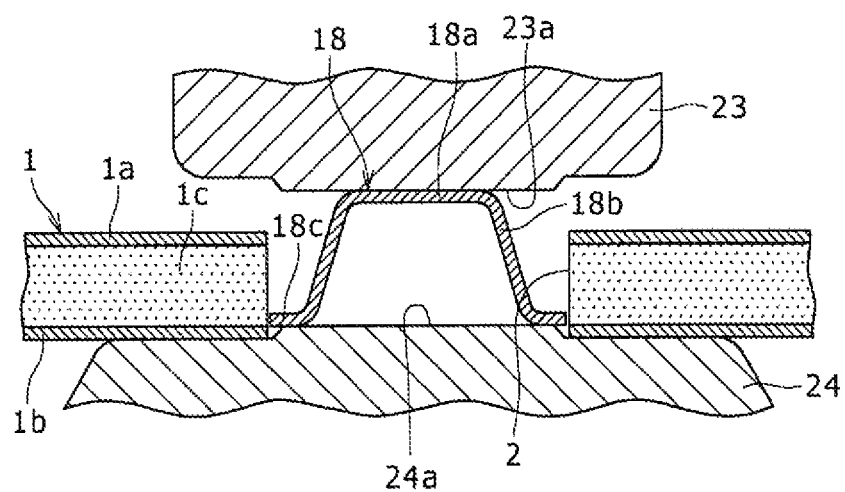
FIGS. 8(a) and 8(b) are cross-sectional views illustrating a process of forming the fastening structure of FIG. 6.
Figure 8B:
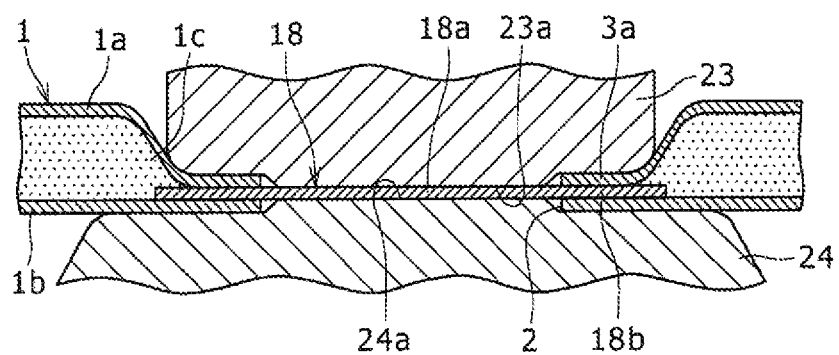

FIGS. 8(a) and 8(b) illustrate a process of forming the fastening structure of the third embodiment. First, as illustrated in FIG. 8(a), the bowl-shaped fastening member 18 is inserted into the through-hole 2 formed in the fastening part of the resin-foam core composite plate 1, and is set between the punch 23 and the die 24. The punch 23 is provided with a circular step part 23a that comes into contact with the fastening member 18, and the die 24 is provided with a circular step part 24a that loads the fastening member 18. Each of the step parts 23a and 24a is formed such that a height thereof is approximately equal to a thickness of each of the front and rear metal plates 1a and 1b.

Thereafter, as illustrated in FIG. 8(b), the punch 23 is lowered. The punch 23 compresses the slant wall part 18b of the fastening member 18 to forcibly spread the slant wall part 18b of the fastening member 18 between the step parts 23a and 24a toward the side of the resin foam 1c between the front and rear metal plates 1a and 1b in a flat shape. Further, the punch 23 compresses the resin foam 1c around the through-hole 2 between the punch 23 and the die 24 at outer circumferential sides of the step parts 23a and 24a. The forcibly spread slant wall part 18b is sandwiched between the front and rear metal plates 1a and 1b of the compression periphery part 3a at which the resin foam 1c is compressed. Finally, as illustrated in FIG. 6, the forcibly spread slant wall part 18h is coupled to the front and rear metal plates 1a and 1b by the resistance weld 16b, and thereby the counterpart member A is fastened to the bottom 18a of the fastening member 18 by the resistance weld 17b.

In the second and third embodiments described above, the counterpart member A is fastened by the resistance welding. However, the fastening member 15 or 19 and the counterpart member A may be fastened by bolt fastening.

In each embodiment described above, the metallic fastening member is formed in the pedestal-attached cylindrical shape, the hat shape, or the bowl shape, but it is not limited thereto. The fastening member has only to be robustly coupled to the compression periphery part of the resin-foam core composite plate by crimping or welding.

In each embodiment described above, the front and rear metal plates of the resin-foam core composite plate are the steel plates or the aluminum plates. However, the front and rear metal plates may employ an aluminized steel plate, another surface-treated steel plate, or other metal plates such as a surface-treated aluminum alloy plate. Further, the metallic fastening member may be formed of an aluminized steel plate, another surface-treated steel plate, an aluminum alloy plate, or a surface-treated aluminum alloy plate.

While each embodiment of the present invention has been described, the present invention is not limited to the aforementioned embodiments, and may be implemented with various modifications insofar as it is described in the claims. The present invention is based on Japanese Patent Application (No. 2012-040183), filed on Feb. 27, 2012, the contents of which are incorporated herein by reference.

EXPLANATION OF REFERENCE NUMERALS 1 resin-foam core composite plate
1a, 1b metal plate
1c resin foam
2 through-hole
3 compression part
3a compression periphery part
4 wall part
5 step part
11 fastening member
11a cylindrical part
11b pedestal part
12 eyelet member
13 bolt

The invention claimed is:

1. A fastening structure for a resin-foam core composite plate, in which the resin-foam core composite plate is stacked by sandwiching a core of a resin foam between metal plates and is fastened to a counterpart member, wherein:
   a fastening part of the resin-foam core composite plate includes a through-hole and a compression periphery part at which the core of the resin foam is compressed around the through-hole; and
   a metallic fastening member inserted into the through-hole is coupled to the compression periphery part by crimping or welding, so that the fastening member is fastened to the counterpart member, wherein:
   the fastening member has a pedestal-attached cylindrical shape in which a pedestal part thereof is provided at one end side of a cylindrical part thereof;
   the compression periphery part includes a tubular wall part standing from a periphery of the through-hole; and
   the cylindrical part of the fastening member is inserted into the through-hole from a proximal end side of the wall part, pressing the pedestal part against the compression periphery part, and the fastening member is crimped to a distal end side of the wall part so as to forcibly spread a distal end side of the cylindrical part protruding from the distal end side of the wall part.

2. The fastening structure for a resin-foam core composite plate according to claim 1, wherein:
   an eyelet member is placed outside the wall part so as to fit an eyelet of the eyelet member to the through-hole; and
   the distal end side of the cylindrical part is crimped to the distal end side of the wall part via the eyelet member.

3. The fastening structure for a resin-foam core composite plate according to claim 2, wherein a step part is formed at an outer circumferential side of the fastening part of the resin-foam core composite plate.

4. The fastening structure for a resin-foam core composite plate according to claim 1, wherein a step part is formed at an outer circumferential side of the fastening part of the resin-foam core composite plate.

5. A fastening structure for a resin-foam core composite plate, in which the resin-foam core composite plate is stacked by sandwiching a core of a resin foam between metal plates and is fastened to a counterpart member, wherein:
   a fastening part of the resin-foam core composite plate includes a through-hole and a compression periphery part at which the core of the resin foam is compressed around the through-hole; and
   a metallic fastening member inserted into the through-hole is coupled to the compression periphery part by crimping or welding, so that the fastening member is fastened to the counterpart member wherein:
   the fastening member has a hat shape in which a flange part thereof is provided for a lower end of a hat part thereof; and
   the flange part is pressed against an outer surface side of one of the metal plates at a periphery part of the through-hole, the hat part is compressed together with the core of the resin foam at the periphery part of the through-hole so as to forcibly spread the hat part inserted into the through-hole toward an outer surface side of the other of the metal plates in a flat shape, and thereby the front and rear metal plates of the compression periphery part are sandwiched by the hat part forcibly spread in the flat shape and the flange part, and the sandwiching hat and flange parts are welded to the front and rear metal plates of the compression periphery part.

6. The fastening structure for a resin-foam core composite plate according to claim 5, wherein a step part is formed at an outer circumferential side of the fastening part of the resin-foam core composite plate.

7. A fastening structure for a resin-foam core composite plate, in which the resin-foam core composite plate is stacked by sandwiching a core of a resin foam between metal plates and is fastened to a counterpart member, wherein:
   a fastening part of the resin-foam core composite plate includes a through-hole and a compression periphery part at which the core of the resin foam is compressed around the through-hole; and
   a metallic fastening member inserted into the through-hole is coupled to the compression periphery part by crimping or welding, so that the fastening member is fastened to the counterpart member wherein:
   the fastening member has a bowl shape in which a slant wall part thereof spreads to an outer circumferential side thereof around a bottom thereof; and
   the bowl-shaped fastening member is inserted into the through-hole, the bowl-shaped fastening member is compressed together with the core of the resin foam at the periphery part of the through-hole so as to forcibly spread the slant wall part toward a side of the resin foam between the metal plates, and thereby the slant wall part forcibly spread in the flat shape is sandwiched by the front and rear metal plates of the compression periphery part, and the sandwiched slant wall part is welded to the front and rear metal plates of the compression periphery part.

8. The fastening structure for a resin-foam core composite plate according to claim 7, wherein a step part is formed at an outer circumferential side of the fastening part of the resin-foam core composite plate.

9. A fastening structure for a resin-foam core composite plate, in which the resin-foam core composite plate is stacked by sandwiching a core of a resin foam between metal plates and is fastened to a counterpart member, wherein:
- a fastening part of the resin-foam core composite plate includes a through-hole and a compression periphery part at which the core of the resin foam is compressed around the through-hole; and
- a metallic fastening member inserted into the through-hole is coupled to the compression periphery part by crimping or welding, so that the fastening member is fastened to the counterpart member, wherein a step part is formed at an outer circumferential side of the fastening part of the resin-foam core composite plate.

10. The fastening structure for a resin-foam core composite plate according to claim 9, wherein the step part is formed in a state in which the resin foam is not foamed, and then the resin foam is foamed.

\* \* \* \* \*